United States Patent [19]

Sargeant et al.

[11] 4,307,051
[45] Dec. 22, 1981

[54] PROCESS FOR MANUFACTURING A LIGHTWEIGHT REFRACTORY PRODUCT

[75] Inventors: Graham K. Sargeant, Dartford; Raymond E. Stone, London, both of England

[73] Assignee: Cawoods Refractories Limited, Great Britain

[21] Appl. No.: 12,241

[22] Filed: Feb. 14, 1979

[51] Int. Cl.$^3$ ............................................. C04B 21/06
[52] U.S. Cl. ..................................... 264/53; 264/44; 264/59; 264/117; 264/DIG. 15
[58] Field of Search ............... 264/44, 59, 117, 53, 264/DIG. 15

[56] References Cited

U.S. PATENT DOCUMENTS

| 2,553,759 | 5/1951 | Geiger | 264/44 X |
| 3,528,809 | 9/1970 | Farnand et al. | 264/44 X |
| 3,666,523 | 5/1972 | Nau | 264/117 X |
| 3,887,671 | 6/1975 | Metzger | 264/117 X |
| 4,025,689 | 5/1977 | Kobayashi et al. | 264/44 X |
| 4,211,738 | 7/1980 | Genis | 264/117 X |

FOREIGN PATENT DOCUMENTS 1445544  2/1967  France ............................ 264/44

Primary Examiner—Jan H. Silbaugh
Attorney, Agent, or Firm—Parmelee, Miller, Welsh & Kratz

[57] ABSTRACT

A process of making a highly porous yet relatively impervious refractory. The process includes taking a particulate pore-forming material or a mixture of refractory raw material with a particulate pore-forming material, providing the individual particles of the pore-forming material or agglomerates of the particles or agglomerates of the mixture with a wet exterior, coating said wet exterior with dry refractory raw material and firing the aggregate so produced.

8 Claims, 4 Drawing Figures

PROCESS FOR MANUFACTURING A LIGHTWEIGHT REFRACTORY PRODUCT

This invention concerns improvements in or relating to refractory compositions.

Lightweight refractories are becoming increasingly important to industry because of their relatively low thermal mass and thermal conductivity. The energy savings attainable from the use of insulation are greater the higher the temperature, so that high quality products of this type are of particular value.

It is desirable that lightweight refractory products do not have a high proportion of relatively large sized open pores (0.5 mm or greater) as this reduces their ability to withstand chemical attack and to contain hot gases.

Normally, refractory aggregates are mixed with a bonding matrix, and the mixture cast, pressed, rammed or otherwise formed into a refractory shape. The bonding matrix is usually in the form of fine powders with water or water solution.

It is an object of the present invention to provide a process whereby lightweight refractory products can be made from a variety of refractory materials.

Viewed from its widest aspect, the invention provides a process of making a highly porous yet relatively impervious refractory, comprising taking a particulate pore-forming material or a mix of refractory raw material with a particulate pore-forming material, providing the individual particles of the pore-forming material or agglomerates of the mix and particles with a wet exterior, coating the said wet exterior with dry refractory raw material and firing the aggregate so produced.

According to another aspect, the invention provides a process of making a lightweight refractory product, such process comprising adding water or water containing a surfactant to a particulate pore-forming material or a mixture of refractory raw material with a particulate pore-forming material whilst subjecting the material or mixture to a tumbling action, in order to wet the particles, adding refractory material to the wetted pore-forming material or mixture whilst still providing the tumbling action and adding water or water containing the surfactant to ensure that the particles and agglomerates thereof are coated by refractory material, drying the wet aggregate thus produced and firing it.

A wide range of particulate pore-forming material may be used. Whilst the said pore-forming material may comprise a non-combustible material, conveniently it is combustible and, for the sake of convenience, will be termed hereinafter "combustible material".

Desirably, the said particulate combustible material is a plastics material, and very conveniently expanded polystyrene in the form of hollow spheres in the size range 15 mm and less, preferably 5 mm and less, for example, having a diameter probably in the range of 0.5-3.0 mm but possibly less.

Such hollow spheres of polystyrene are commonly known as expanded polystyrene. Expanded polystyrene is generally made from dense polystyrene beads which contain a proportion of volatile hydrocarbon, for example, pentane, so that the beads may be expanded on heating by steam to form hollow spheres. Preferably, when the said particular material comprises expanded polystyrene, sufficiently developed and expanded beads which contain a sufficiently small amount of residual hydrocarbon are used because expansion of the spheres in the drying stage could dislodge the coating. We have found that smaller size ranges may be made by heating expanded polystyrene in hot air so that the spheres first swell and then deflate to have a higher final density than the original expanded polystyrene. Suitable dense beads are commercially available which on steam expansion yield expanded polystyrene with a bulk density of 16 g. per liter in the size range 0.5–3.0 mm. On heating in hot air this expanded polystyrene first swells and then deflates to have a final bulk density of 54 g. per liter with a correspondingly smaller particle size range.

The process of the invention may include the step of taking polystyrene beads and heat treating the beads to control their size prior to using them as the said combustible material.

Preferably, the water or water containing a surfactant is added by spraying. A surfactant is used in cases where the combustible material is not readily wettable, e.g. when it comprises polystyrene, but is not necessary in other cases, e.g. when the combustible material comprises wood flour.

Any refractory material which has a sufficiently fine particle size to coat the individual particles of the pore-forming material or agglomerates of the particles or agglomerates of the mixture under the process conditions and which may be sintered by firing to give the desired product may be used. Examples of raw refractory materials which may be used are clay with alumina, alumina, magnesia, magnesia with clay, silica, zirconia, chromia and lime.

Thus, viewed from a still further aspect, the invention provides a process of making a lightweight refractory product, such process comprising subjecting expanded polystyrene in the form of hollow spheres in the size range 0 to 15 mms to a tumbling action, spraying water containing a surfactant onto the said polystyrene whilst being tumbled in order to wet the spheres, adding thereto, whilst still providing the tumbling action, refractory raw material mix to ensure that the particles are coated by refractory mix, and so regulating the rate and frequency of additions to prevent the formation of larger agglomerates, drying the wet aggregate thus produced and subsequently firing it.

If desired, additives may be included in the water to improve aggregate strength. Thus, for example, a silica sol or binding agents such as aluminium polyoxychlorides may be used.

Conveniently, the process is carried out by adding the pore-forming material to a revolving pan or drum.

According to yet another aspect of the invention, there is provided apparatus for use in carrying out the process of the invention, such apparatus comprising a pan which may be revolved at any angle to the vertical from steeply inclined to horizontal, and means including a nozzle whereby a fine spray of water may be directed on to the contents of the pan.

The said apparatus may also include means for heating polystyrene beads before using them as the said particulate pore-forming material.

The invention also extends to lightweight refractory product made using the process of the invention to refractories made therefrom and to unfired shapes prepared ready for firing.

The porosity of the refractories produced by the process of the invention may be varied by varying the ratio of the said pore-forming material to the said refractory raw material.

It will be appreciated that the process of the invention is versatile, there being no restriction on the chemical composition of the final refractory aggregate except that the refractory raw material should have a sufficiently fine particle size, whilst a range of products can be made from each particular raw material mix by simply varying the amount of pore-forming material.

In order that the invention may be more readily understood one embodiment of the apparatus thereof and several Examples of the process will now be described, the apparatus being described with reference to the accompanying drawing in which;

FIG. 1 diagrammatically illustrates in perspective an embodiment of the apparatus of the invention;

Figure 1:
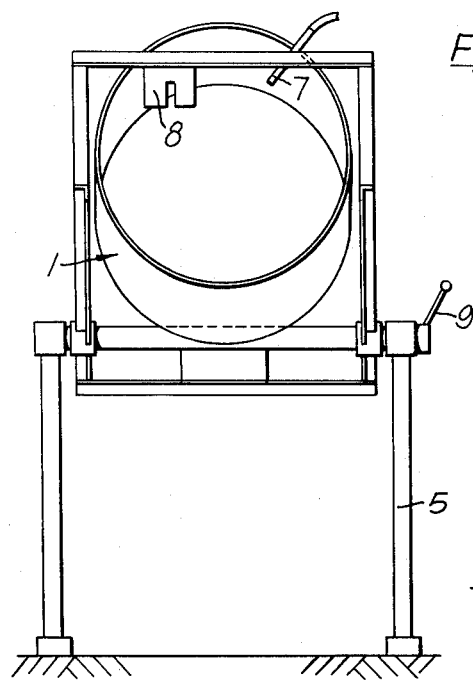

In the embodiment being described, the apparatus comprises a revolving inclined pan generally indicated at 1 approximately 68 cms. in diameter and 28 cms. deep supported with a drive mechanism including a bearing 2 and a variable speed motor 3 on a support frame 4 which in turn is secured to a main frame 5. A frame member 6 also supports a nozzle 7 through which water containing a surfactant may be sprayed by pump means via a suitable valve (not shown). A scraper 8 is also provided.

The angle of inclination to the horizontal and the speed of rotation of the pan are variable, a locking lever 9 being provided for anchoring the support frame 4 at a selected angle to the main frame 5.

Such apparatus was used in carrying out the Examples as batch operations. In all Examples the spray was operated by an on/off switch and the refractory mix added manually by shaking from a scoop. It is anticipated that better methods of production can be devised by mere extensions of these principles, for instance, automation.

In the Examples, the sieve analysis figures are percentages of fractions using B.S. sieves, the packing densities and bulk densities are given in gms./cc and the porosities given are percentages by volume.

EXAMPLE 1

A refractory mix was prepared from a mixture of good quality dry powdered china clay with a calcined alumina, such that the ignited mixture would have an analysis of 72.9% $Al_2O_3$, by grinding in a ball mill until 95% would pass a $-200$ British Standard sieve.

90 g. of expanded polystyrene in the size range about 0.5–3.0 mm was loaded into the pan 1 of the hereinbefore described apparatus. The angle of inclination of the pan 1 to the vertical was set at 35° and the pan 1 was set to rotate at 30 r.p.m. so that the contents rose up the pan wall and fell down in a cascade.

The nozzle 7 had a nominal capacity of 0.2 liters per minute and gave a flat spray subtending an angle of 90°. It was directed at the junction between the pan wall and bottom and in such a position that it evenly wetted a limited area of the cascade of polystyrene across its full width. The spray water contained 1% of non ionic surfactant.

Sufficient spray was added in a short burst to wet the cascading polystyrene turning it to a weakly coherent mass.

On dusting with a little refractory mix, this mass reverted to separate particles. Alternative bursts of spray and dusting with refractory mix was continued for approximately 8 minutes during which 500 c.c.'s of spray were added together with 3.6 Kg. of refractory mix.

The wet aggregate produced was discharged by tilting the pan and was then dried and fired in a tunnel kiln with a hot zone temperature of 1730° C.

The fired aggregate was lightly sintered and easily broken down to lightweight particles the vast majority of which were in the form of small hollow spheres.

The fired aggregate had the following properties:

| Sieve Fraction | $-3/16 +\frac{1}{8}$ | $-\frac{1}{8}\ 1/16$ | $-1/16 +22$ |
|---|---|---|---|
| Sieve analysis | 27% | 62% | 11% |
| Loose bulk density | — | 0.60 | — |
| Aggregate bulk density | — | 0.97 | — |
| Aggregate total porosity | — | 69% | — |

Aggregate bulk density and aggregate total porosity were determined by water displacement and assuming the solid had a true S.G. of 3.13.

We found that by judicious application of the spray, and alteration of the angle of the vessel a proportion of the polystyrene agglomerated and coarser honeycombe structured aggregate could be produced.

A refractory brick mix was prepared as follows:

| | |
|---|---|
| $-\frac{1}{8}$ +1/16 aggregate | 24% |
| $-1/16$ +22 aggregate | 40% |
| $-22$ Cawoods Sintered Mullite | 5.6% |
| $-100$ Cawoods Sintered Mullite | 10.4% |
| Cawoods High Purity Bond 5050 | 16.0% |
| G.C Powder | 4.0% |

A 2"×2" dia. test piece was made by hand ramming the mix into a cylindrical mould. After demoulding, it was dried 6 hrs. at 100° C. and fired 6 hrs. at 1750° C. It was found that:

| | |
|---|---|
| Volume shrinkage- as moulded to fired | 5% |
| Bulk density | 0.88g/cc. |
| Total porosity | 72% |
| Cold crushing strength | 600 p.s.i. |

During the crushing test, there was no evidence of any fracture of the aggregate, so that higher values would result if the bonding matrix were stronger.

EXAMPLE 2

Figure 3:
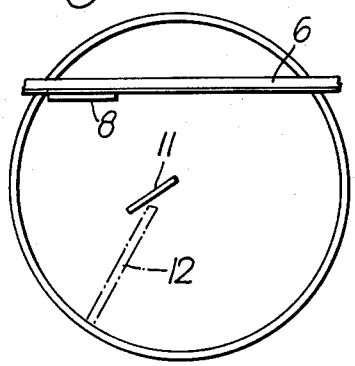
FIG. 3 is a diagrammatic illustration of apparatus used in carrying out Example 2.

A smaller sized mullite aggregate was made by using the same expanded polystyrene as used in Example 1 but heat treated to increase its bulk density. Thus, the expanded polystyrene was loaded into open containers and heated in a thermostatically controlled fan oven (generally indicated at 10 in FIG. 3) set at 130° C. for approximately 15 minutes. The material first decreased in bulk density and thereafter increased. The bulk density of the initial polystyrene was 16 g. per liter and after heat treatment it was 54 g. per liter.

This heat treated expanded polystyrene was loaded into the pan 1 and used to prepare a mullite aggregate using the same apparatus and method as described in Example 1.

The materials added to the revolving drum included:

| | |
|---|---|
| Heat treated polystyrene | 170 g. |
| Clay alumina mixture | 2000g. |

After drying and firing through the same tunnel driers and kiln, the loosely sintered aggregate was easily broken down into individual particles the vast majority of which were in the form of small hollow spheres. The material had the following properties:

| Sieve Fraction | −3/16 +⅛ | −⅛ +1/16 | −1/16 +22 | −22 |
|---|---|---|---|---|
| Sieve analysis | 5.5% | 29.5% | 57.5% | 7.5% |
| Loose bulk density | — | 0.45 | 0.44 | — |
| Aggregate bulk density | — | 0.75 | 0.64 | — |
| Aggregate total porosity | — | 76% | 80% | — |

EXAMPLE 3

Figure 4:
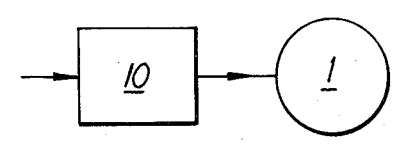
FIG. 4 is a plan view of a pan of a modified embodiment of the apparatus of FIGS. 1 and 2.
Figure 2:
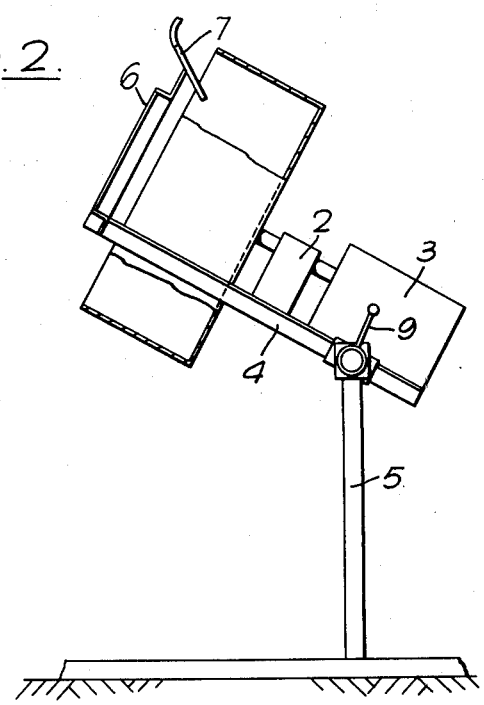
FIG. 2 is a side view of the apparatus of FIG. 1.

In this Example, the apparatus of FIGS. 1 and 2 modified as shown in FIG. 4 to include an additional scraper 11 and with the nozzle 7 re-sited so that its spray wets the bottom of the pan to cover the area indicated at 12 was so arranged that the pan 1 rotated in a horizontal plane.

The pan 1 was rotated at 82 r.p.m. and was loaded with 90 g. of polystyrene as used in Example 1. Spray water containing 1% of non ionic surfactant as described in Example 1 and 25% of aluminium oxychloride solution was added in a short burst to convert the material into a coherent mass which was then broken down into separate particles by dusting with micronised alumina using the method as described in Example 1. Alternative short bursts of spray and dusting were continued until during a period of 8 minutes some 500 c.c.'s of spray were added and 4.5 Kg. of the ceramic powder.

The wet aggregate was dried and then fired in a tunnel kiln having a hot zone temperature of 1730° C.

The fired aggregate so prepared was lightly sintered together, and easily broken down into lightweight particles, the vast majority of which were in the form of small hollow spheres.

A refractory mix was prepared using sieved out fractions from the aggregate.

| | |
|---|---|
| −⅛ +1/16 Aggregate | 25.7% |
| −1/16 +22 Aggregate | 44.2% |
| −22 Cawoods Fused Alumina | 6.4% |
| −100 Cawoods Fused Alumina | 9.6% |
| Cawoods High Purity Bond 5050 | 10.4% |
| Cawoods G.C Powder | 3.7% |

A 2"×2" dia. test piece was made by hand ramming the mix into a cylindrical mould. After demoulding it was dried for 6 hrs. at 100° C. and fired 6 hrs. at 1730° C.

It was found that:

| | |
|---|---|
| Volume shrinkage as moulded to fired | 3% |
| Bulk density | 1.18g/cc |
| Total porosity | 70% |
| Cold crushing strength | 700 p.s.i. |

EXAMPLE 4

The revolving pan 1 was set at an angle of inclination to the vertical of 35° and set to rotate at a speed of 30 r.p.m. The spray nozzle was 0.2 liters per minute giving a flat spray with an angle of 90° so set that it would wet across the cascade and just below mid-height. The pumping pressure was in the range 15–25 p.s.i. −12 mesh wood flour was added and sprayed until small pellets were formed. Further quantities of wood flour and spray were continued and the conditions so controlled that small pellets were continuously formed and discharged from the pan. The final pellets were about 50% spray by weight.

2.55 kgs. of the small wet wood flour pellets were loaded back into the drum and these were alternatively dusted with fine caustic calcined magnesia (Lycal 93/12 powder as supplied by the Steetley Company) and sprayed. Further dusting followed by spraying was continued until 2.86 kgs. of magnesia had been added together with 0.35 kgs. of spray. The aggregate was discharged from the revolving pan by tilting and loaded into a saggar, dried and fired by passing through a tunnel kiln which peaked at 1730° C.

The fired aggregate was brown in colour and was a loosely sintered mass of well formed hollow spheres which had the following properties:

| Sieve fraction | −3/16 +⅛ | −⅛ +1/16 | −1/16 +22 |
|---|---|---|---|
| Seive analysis | 50.5% | 43.0% | 6.5% |
| Loose bulk density | — | 0.97 | — |
| Aggregate bulk density | — | 1.56 | — |
| Aggregate total porosity | — | 56.5% | — |

We claim:

1. In a process for manufacturing a lightweight refractory product wherein bodies of particulate pore-forming material are coated with a refractory raw material and said coated bodies are then dried and subsequently fired in order to decompose said bodies of particulate pore-forming material and form hollow bodies of said refractory material, the improvement for providing a uniform coating of refractory material having a predetermined thickness on the bodies of particulate pore-forming material comprising the steps of:
   effecting a continuous tumbling motion of said bodies of particulate pore-forming material consisting essentially of polystyrene, said tumbling motion producing a continuous cascade of said bodies;
   spraying water onto said cascade of tumbling bodies in order to wet the exterior surface thereof and turning said tumbling bodies into a weakly coherent mass; and
   dusting said wet tumbling bodies with said refractory raw material, said dusting causing said weakly coherent mass to revert to separate particles;
   repeating the steps of spraying and dusting said tumbling bodies to produce a uniform coating of refractory material of the aforementioned predetermined thickness on said bodies of particulate pore-forming material.

2. The process of claim 1, in which said water includes a surfactant.

3. The process of claim 1, in which the polystyrene is in the form of hollow spheres up to 15 mm in diameter.

4. The process of claim 3, including the step of heating the polystyrene spheres to control their size prior to using them as the combustible material.

5. The process of claim 3 wherein the polystyrene is in the form of a hollow sphere of between 0.5 and 5 mm in diameter.

6. The process of claim 1, in which at least one additive is included in the water to improve aggregate strength.

7. The process of claim 1, in which the refractory raw material comprises a material selected from the group consisting of clay with alumina, alumina, magnesia and magnesia with clay, to give mullite, alumina, magnesia and spinel products.

8. The process of claim 1 wherein the bodies are alternately contacted by the water and refractory material during a limited portion of the cascade.

* * * * *